(12) United States Patent
Bahr

(10) Patent No.: US 9,414,297 B2
(45) Date of Patent: Aug. 9, 2016

(54) METHOD AND NETWORK NODE FOR ROUTING DATA PACKETS IN COMMUNICATION NETWORKS

(75) Inventor: Michael Bahr, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 2088 days.

(21) Appl. No.: 12/310,390

(22) PCT Filed: Aug. 22, 2007

(86) PCT No.: PCT/EP2007/058713
§ 371 (c)(1),
(2), (4) Date: Feb. 24, 2009

(87) PCT Pub. No.: WO2008/031698
PCT Pub. Date: Mar. 20, 2008

(65) Prior Publication Data
US 2009/0196227 A1 Aug. 6, 2009

(30) Foreign Application Priority Data
Aug. 24, 2006 (DE) .......................... 10 2006 039 635

(51) Int. Cl.
*H04W 40/28* (2009.01)
*H04L 12/733* (2013.01)
(Continued)

(52) U.S. Cl.
CPC ............... *H04W 40/28* (2013.01); *H04L 45/20* (2013.01); *H04L 45/26* (2013.01); *H04L 45/32* (2013.01); *H04L 45/34* (2013.01); *H04W 88/04* (2013.01)

(58) Field of Classification Search
None
See application file for complete search history.

(56) References Cited

U.S. PATENT DOCUMENTS

2005/0014510 A1* 1/2005 Jeon .......................... 455/452.2
2005/0047350 A1* 3/2005 Kantor et al. ................. 370/254
(Continued)

FOREIGN PATENT DOCUMENTS

| JP | 2005-252857 | 9/2005 |
| WO | WO 2005062554 A1 | 7/2005 |
| WO | WO 2005091576 A1 | 9/2005 |

OTHER PUBLICATIONS

Perkins et al., Network Working Group Request for Comments: 3561, Ad hoc On-Demand Distance Vector (AODV) Routing, Jul. 2003.*

(Continued)

*Primary Examiner* — Christine Duong
(74) *Attorney, Agent, or Firm* — Slayden Grubert Beard PLLC

(57) ABSTRACT

A method routes data packets especially in wireless communication network formed by a plurality of network nodes. In order to transmit data packets from a first network node acting as a data packet source to a second network node acting as a data packet sink according to said method, the data packets are transmitted with the help of at least one additional communication network node that is dissociated from the source node, a first network message is transmitted from the source node at least to the additional network node so as to be successively forwarded to each additional network node until the additional network node corresponds to the sink node, the respective additional network node supplies routing data based on the first message in such a way that first data on a next network node on the way to the source node and the value of a first validity period in the actual additional network node is temporarily stored, and the value of the respective validity period is stored in such a way that all first data remains stored at least until a second network message which is sent by the sink node and confirms the first network message has been received by the source node.

20 Claims, 3 Drawing Sheets

(51) Int. Cl.
*H04L 12/721* (2013.01)
*H04W 88/04* (2009.01)

(56) References Cited

U.S. PATENT DOCUMENTS

| | | | |
|---|---|---|---|
| 2005/0094594 A1 | 5/2005 | Roh | |
| 2007/0248067 A1* | 10/2007 | Banerjea et al. | 370/338 |
| 2008/0144512 A1* | 6/2008 | Molisch et al. | 370/238 |
| 2009/0274128 A1* | 11/2009 | Zhang et al. | 370/338 |

OTHER PUBLICATIONS

Osamaaboul-Magd et al: Joint SEE-Mesh/Wi-Mesh Proposal to 802.11 TGs, IEEE 802.11-06/0328r0, pp. 36-38 and 68-76, Feb. 2006, pp. 1-165.

Japanese Office Action (submitted in German) issued Jun. 9, 2011 in corresponding Japanese Patent Application 2009-525066.

Perkins C. et al: Ad hoc On-Demand Distance Vector (AODV) Routing, IETF, Experimental, RFC 3561, Jul. 2003.

* cited by examiner

FIG 3A

| Destination | Node S Next Hop | Life Time | Destination | Node A Next Hop | Life Time | Destination | Node B Next Hop | Life Time | Destination | Node G Next Hop | Life Time | Destination | Node D Next Hop | Life Time |
|---|---|---|---|---|---|---|---|---|---|---|---|---|---|---|
|  |  |  | S | S | 10 | S | A | 10 |  |  |  |  |  |  |

FIG 3B

| Destination | Node S Next Hop | Life Time | Destination | Node A Next Hop | Life Time | Destination | Node B Next Hop | Life Time | Destination | Node G Next Hop | Life Time | Destination | Node D Next Hop | Life Time |
|---|---|---|---|---|---|---|---|---|---|---|---|---|---|---|
|  |  |  | S | S | 10 | S | A | 10 |  |  |  |  |  |  |

FIG 3C

| Destination | Node S Next Hop | Life Time | Destination | Node A Next Hop | Life Time | Destination | Node B Next Hop | Life Time | Destination | Node G Next Hop | Life Time | Destination | Node D Next Hop | Life Time |
|---|---|---|---|---|---|---|---|---|---|---|---|---|---|---|
|  |  |  | S | S | 10 | S | A | 10 |  |  |  |  |  |  |

FIG 3D

| Destination | Node S Next Hop | Life Time | Destination | Node A Next Hop | Life Time | Destination | Node B Next Hop | Life Time | Destination | Node G Next Hop | Life Time | Destination | Node D Next Hop | Life Time |
|---|---|---|---|---|---|---|---|---|---|---|---|---|---|---|
|  |  |  | S | S | 10 | S | A | 10 | S | B | 5 |  |  |  |

FIG 3E

| Destination | Node S Next Hop | Life Time | Destination | Node A Next Hop | Life Time | Destination | Node B Next Hop | Life Time | Destination | Node G Next Hop | Life Time | Destination | Node D Next Hop | Life Time |
|---|---|---|---|---|---|---|---|---|---|---|---|---|---|---|
|  |  |  | S | S | 10 | S | A | 10 | S | B | 5 | S | G | 5 |

METHOD AND NETWORK NODE FOR ROUTING DATA PACKETS IN COMMUNICATION NETWORKS

CROSS REFERENCE TO RELATED APPLICATIONS

This application is based on and hereby claims priority to PCT Application No. PCT/EP2007/058713 filed on Aug. 22, 2007 and German Application No. 10 2006 039 635.9 filed on Aug. 24, 2006, the contents of which are hereby incorporated by reference.

BACKGROUND OF THE INVENTION

The invention relates to a method for routing data in communication networks and to a network node for routing data in communication networks.

It is known that in order to determine the path of a data packet, network nodes decide by which path a data packet is to be forwarded so that the latter reaches a receiving network node by, for example, the fastest possible path. This procedure is known as what is termed "routing". Different approaches to implementing the routing culminated in different routing protocols.

According to routing protocols of this type, routes that have been determined are frequently associated with a "lifetime", i.e. with a timeout, such that the routes are removed from routing tables in the event of non-acknowledgement of the route without additional control packets after a timer set with the lifetime has expired.

A similar approach is adopted in reactive routing protocols which are used for mobile so-called "ad hoc" networks, in particular wireless mesh networks, and which are based on the distance vector method, such as for example the so-called "Ad hoc On-Demand Distance Vector" (AODV) protocol (cf. Perkins, C. E., Belding-Royer, E. M., and Das, S. R. "Ad hoc On-Demand Distance Vector (AODV) routing", IETF Experimental RFC 3561, July 2003, AODV RFC) or the "Hybrid Wireless Mesh Protocol" (HWMP) protocol (cf. IEEE P802.11sm/D0.03, Draft amendment to standard IEEE 802.11 TM: ESS Mesh Networking, IEEE, August 2006, Work in Progress).

Usually a route in a network is defined by corresponding entries in routing tables of network nodes. Every network node on the path from a source node to a destination node has in its routing table an entry for the destination node that specifies the next so-called "hop", i.e. the next network node to be reached on the route to the destination node D.

In the case of the AODV and HWMP protocols, the reactive route search begins with a network-wide broadcast of what is termed a "route request" message (RREQ) which sets up what are termed "reverse routes" from all the network nodes to the source node. The destination node will also receive one or more RREQs. Every RREQ packet received stands for a possible route to the source node. On the selected reverse route the destination node sends a "route reply" message (RREP) by unicast, which message enters what is termed the "forward route" in all of the network nodes on the selected route.

A problem with this method of proceeding is that the lifetime of the reverse routes generated by the RREQs must be sufficiently long, since the reverse routes must also continue to exist when the RREP is sent back to the originator node S and S begins to send the data to D.

SUMMARY

One possible object is to disclose a method and an arrangement which remove the disadvantages of the related art.

The inventor proposes a method for routing data packets in an in particular wireless communication network formed from a plurality of network nodes, in order to transmit data packets from a first network node acting as a source of the data packets to a second network node acting as a sink of the data packets, the data packets are transmitted with the assistance of at least one further network node (A, B, G, D) of the communication network that is disjoint with respect to the source node; starting from the source node, a first network message is transmitted at least to the further network node such that it is forwarded successively to each further network node until the further network node corresponds to the sink node (D); the respective further network node makes route information available on the basis of the first message such that a first item of information about a next network node on the path to the source node and the value of a first validity period are temporarily stored in the current further network node; the value of the respective validity period is stored such that all first items of information remain stored at least until a second network message sent by the sink node and acknowledging the first network message has been received by the source node.

By this method it is ensured that for all the network nodes involved in a reverse route a lifetime is used which avoids premature timeout of the respective reverse route in one of the network nodes or even resulting gaps. Furthermore, the value of a first validity period in a network node can also be represented as an instant in time. In this way it is advantageously also possible for the sink node to be reached without intermediate nodes. It also works if only two nodes in all, i.e. only source and sink, are present.

It is further ensured by the method that different lifetimes can also be configured for or with each route request so that a better matching to current characteristics of the network or of individual network nodes can take place as a result.

In this case the value of the first validity period is preferably stored such that this does not happen only if a greater value is already stored in the current network node. In this way possibly better matched higher values can be retained and the safeguarding of a minimum lifetime which avoids fast timeouts or gaps in the route continues to be ensured.

It is also of advantage if the method is developed in such a way that the value of the first validity period is generated dynamically. In this manner it is ensured that the minimum lifetime is optimally matched to the current network characteristics, with the result that the advantage is achieved with a high degree or reliability.

A further advantageous embodiment of the method is given if the generation of the value according to the AODV protocol is defined by the function max(ExistingLifetime,MinimalLifetime)

where

MinimalLifetime=(current_time+2*NET_TRAVERSAL_TIME−2*HopCount*NODE_TRAVERSAL_TIME), ExistingLifetime is the lifetime of an already existing route to the source node,
MinimalLifetime is an estimate of the lifetime that is to be set as a minimum, current_time is the current system time,
NET_TRAVERSAL_TIME is a first parameter which can be set for each network node and which represents an estimate of the maximum time taken to send an RREQ through the network,
HopCount is the number of further network nodes traversed by the RREQ packet up to and including the current network node, which number can be taken from the updated rreq.hopcount field of the RREQ, NODE_TRAVERSAL_TIME is a second parameter which can be set for each network node and which represents an estimate of the maximum processing time of a packet in a network node.

In this case, in order to ensure that the correct hop count is present it is necessary in particular to increment the Hop-Count by one first following reception. This development is suitable in particular for wireless mesh networks.

Alternatively or in addition it is of advantage to develop the method in such a way that the value of the first validity period is specified according to the HWMP protocol by $$\text{current\_time} + \text{HWMP\_ACTIVE\_ROUTE\_TIMEOUT}$$

where
current_time is the current system time, and
HWMP_ACTIVE_ROUTE_TIMEOUT is a parameter which can be configured for each network node.
Here too, a special suitability for wireless mesh networks, as are known according to the IEEE 802.11s standard, is given.

In this case the first message is preferably formed as a route request "RREQ" message, since this message type is required for setting up a reverse route and reaches all the network nodes involved.

It is particularly suitable for achieving the good performance if the RREQ message is extended by a data field for the first validity period. In this case network nodes can simply extract and possibly take over the minimum lifetime during the evaluation of the RREQ message that is necessary in any case. A great advantage resulting from this lies in the fact that precisely one node (the source node S) specifies the lifetime for the entire route. This avoids problems if the values set on the nodes, which actually should all be the same, are nonetheless different in size.

In this case a length of four octets is preferably reserved for the data field.

The data field for the first validity period in the RREQ message (rreq.lifetime) can be set in the source node to a value corresponding to the above-described validity period according to the AODV protocol, with $$\text{rreq.lifetime} = 2 * \text{NET\_TRAVERSAL\_TIME}$$

where
NET_TRAVERSAL_TIME is a first parameter which can be set for each network node and which represents an estimate of the maximum time taken to send an RREQ through the network.

This development is particularly suitable for wireless mesh networks.

Alternatively or in addition it is of advantage to develop the method in such a way that the value of the first validity period in the RREQ message is specified in the source node according to the HWMP protocol by $$\text{rreq.lifetime} = \text{HWMP\_ACTIVE\_ROUTE\_TIMEOUT}$$

where
HWMP_ACTIVE_ROUTE_TIMEOUT is a parameter which can be configured for each network node.
Here too, a special suitability for wireless mesh networks, as are known according to the IEEE 802.11s standard, is given.

Alternatively or in addition, the value of the first validity period in the RREQ message can be set in the source node to an arbitrary value greater than the minimum necessary validity period.

The further network nodes which process an RREQ message take over the rreq.lifetime value of the first validity period for the first validity period of the reverse route.

In a further advantageous embodiment, the further network nodes adjust the first validity period of the reverse route correspondingly according to the above formula of AODV $$\max(\text{ExistingLifetime}, \text{MinimalLifetime})$$

where $$\text{MinimalLifetime} = (\text{current\_time} + \text{rreq.lifetime} - X * \text{rreq.hopcount} * \text{NODE\_TRAVERSAL\_TIME})$$
with $X$ in $\{1,2\}$ before it is stored in the corresponding network node. The first validity period in the RREQ message remains unchanged. This development acts particularly advantageously when the AODV protocol is used if $X=2$ is set, since then the RREP purely theoretically reaches every intermediate node with the same remaining lifetime. With $X=1$ the remaining lifetime increases, the closer one gets to the source node, so that this is of advantage in terms of the longer availability of the last part of the reverse route.

Alternatively this adjustment can be achieved by reducing the first validity period in the RREQ message. It is updated in accordance with the function $$\text{rreq.lifetime} := \text{rreq.lifetime} - X * \text{NODE\_TRAVERSAL\_TIME with } X \text{ in } \{1,2\}$$

before it is stored as the first validity period in the current network node. The forwarded RREQ message contains the updated, adjusted lifetime.

Developments advantageously concretizing the method are provided by the following variants for setting the value of the lifetime:

a. Setting in the (Intermediate) Node
  i. max(ExistingLifetime, MinimalLifetime), where MinimalLifetime is the lifetime which is to be used for this RREQ
  ii. According to AODV: max(ExistingLifetime, MinimalLifetime), where MinimalLifetime=(current_time+2*NET_TRAVERSAL_TIME−2*rreq.hopcount*NODE_TRAVERSAL_TIME)
  iii. According to AODV with improvement: max(ExistingLifetime, MinimalLifetime), where MinimalLifetime=(current_time+2*NET_TRAVERSAL_TIME−rreq.hopcount*NODE_TRAVERSAL_TIME)
  iv. According to HWMP: max(ExistingLifetime, MinimalLifetime), where MinimalLifetime=HWMP_ACTIVE_ROUTE_TIMEOUT
  v. max(ExistingLifetime, MinimalLifetime), where MinimalLifetime=rreq.lifetime
  vi. max(ExistingLifetime, MinimalLifetime), where MinimalLifetime=(current_time+rreq.lifetime−X*rreq.hopcount*NODE_TRAVERSAL_TIME) with X={1,2} b. Setting the Value of the First Validity Period (Rreq.lifetime)
  i. Set fixed value similarly as in the case of AODV with rreq.lifetime=2*NET_TRAVERSAL_TIME (Since hopcount=0 is set in the source node, the second term is omitted. Take over this value in the RREQ in intermediate nodes.
  ii. Set fixed value similarly as in the case of HWMP with rreq.lifetime=HWMP_ACTIVE_ROUTE_TIMEOUT. Take over this value in the RREQ in intermediate nodes.
  iii. Set fixed value for rreq.lifetime that is large enough. Take over this value in the RREQ in intermediate nodes.
  iv. Same as i-iii, except that in the intermediate nodes adjust the value for the lifetime in the RREQ with rreq.lifetime:

=rreq.lifetime−
X*rreq.hopcount*NODE_TRAVERSAL_TIME) with
X={1,2}.

In this way a technical implementation is made possible which sets the lifetime as an instant in time (in this case because of current_time). Alternatively or in addition the lifetime can be set as a period of time in the routing table.

If the second message is formed as a route reply "RREP" message, an implementation of the method is particularly supported, especially in wireless mesh networks. In this case it is of advantage if the value of a second validity period of the RREP message is set equal to the value of the first validity period on the part of the sink node. The advantage is that forward and reverse route have virtually the same or a very similar lifetime.

The proposed network node enables the realization of the method, since it has devices for performing the method so that as a result its advantages become effective.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows a schematic flow sequence of an exemplary embodiment of the proposed method, illustrated with the aid of routing tables.

DETAILED DESCRIPTION OF THE PREFERRED EMBODIMENT

Figure 1:
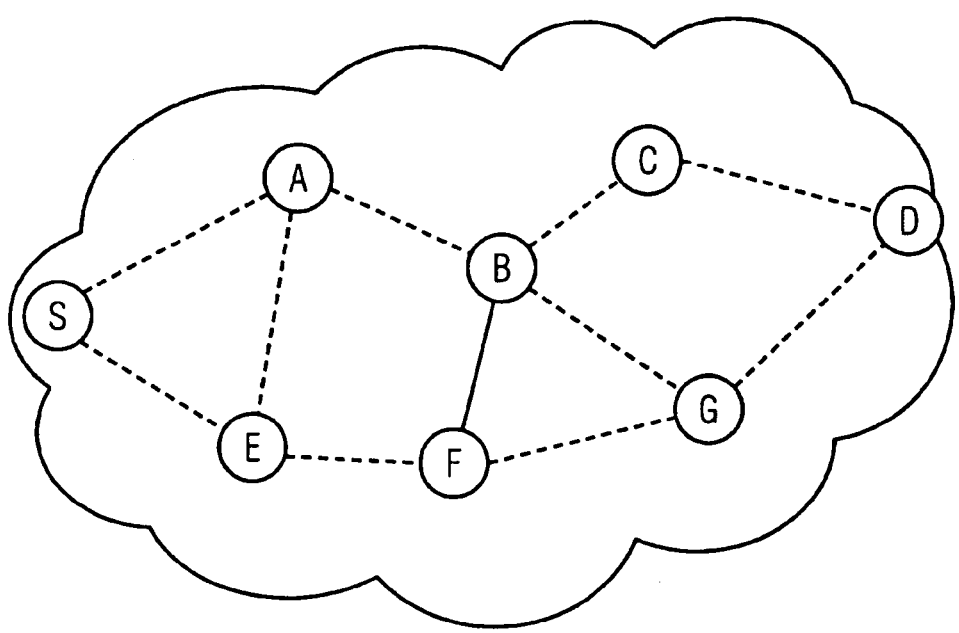
FIG. 1 shows a wireless mesh network as an exemplary scenario underlying the proposed method.

Reference will now be made in detail to the preferred embodiments of the present invention, examples of which are illustrated in the accompanying drawings, wherein like reference numerals refer to like elements throughout.

FIG. 1 shows an exemplary arrangement of network nodes, as might be given in a network according to the related art. The arrangement of network nodes thus sets out a scenario with the aid of which the train of thought leading to problem finding is to be expounded.

What can be seen in the figure is a schematic representation of a network which is embodied by way of example as a wireless mesh network. Wireless links existing for this are indicated in the diagram by dotted lines.

Also shown in the scenario is a node assuming the role of a data-sending source node S which wants to transfer data to a destination node D.

For this purpose the source node S has at its disposal essentially all the network nodes A . . . G located between the source node S and the destination node D in the network.

To ensure a suitable path is found, the required route search is now conducted in accordance with the AODV and HWMP protocols with the "route request" message (RREQ), which sets up the "reverse routes", i.e. routes directed backward toward the source node S, from all the network nodes A . . . G and from the destination node D to the source node S.

As explained above, the destination node D will likewise receive one or more RREQs, with each of the received RREQ packets standing here for a possible route to the source node S.

Destination node D sends a "route reply" message (RREP) by unicast on the selected reverse route, the message entering the so-called "forward route", i.e. the route in the direction of the destination node D, in all network nodes A . . . G on the selected route and in the source node S.

In this case the lifetime of the reverse routes generated by the RREQs must be sufficiently long, since they must also continue to exist when the RREP is sent back to the source node S and the source node S begins transmitting the data to the destination node D.

According to the AODV protocol, the lifetime of the reverse route is calculated on the basis of constants individually configured on each network node. This happens as follows:

Each time an RREQ message is received, an entry in relation to the lifetime of the reverse route of an IP address assigned to the source node is set according to AODV as a maximum of (ExistingLifetime,MinimalLifetime)

where according to AODV MinimalLifetime is defined as

MinimalLifetime=(current time+2*NET_TRAVERSAL_TIME−
2*HopCount*NODE_TRAVERSAL_TIME).

In this case ExistingLifetime is the lifetime of a possibly already existing path to the source node S. NET_TRAVERSAL_TIME and NODE_TRAVERSAL_TIME are parameters which can be configured for each network node and are set in each node. It is particularly advantageous for carrying out the method here if these values are the same in all nodes.

According to the HWMP protocol the lifetime of the reverse route is set corresponding to a fixed parameter HWMP_ACTIVE_ROUTE_TIMEOUT which is to be configured individually on each mesh network node.

The corresponding standards specify default values for the aforementioned configurable parameters. User-specific values can also be assigned to the parameters, however.

In a scenario known from the related art, such as the example chosen here, it was recognized that even when AODV or HMWP is used it is necessary to ensure that all the lifetimes of reverse routes generated by an RREQ message are sufficiently long. It must be avoided that the lifetime is too short on any of the possible network nodes A . . . G and D, since otherwise a gap or interruption would result in the reverse route.

Figure 2:
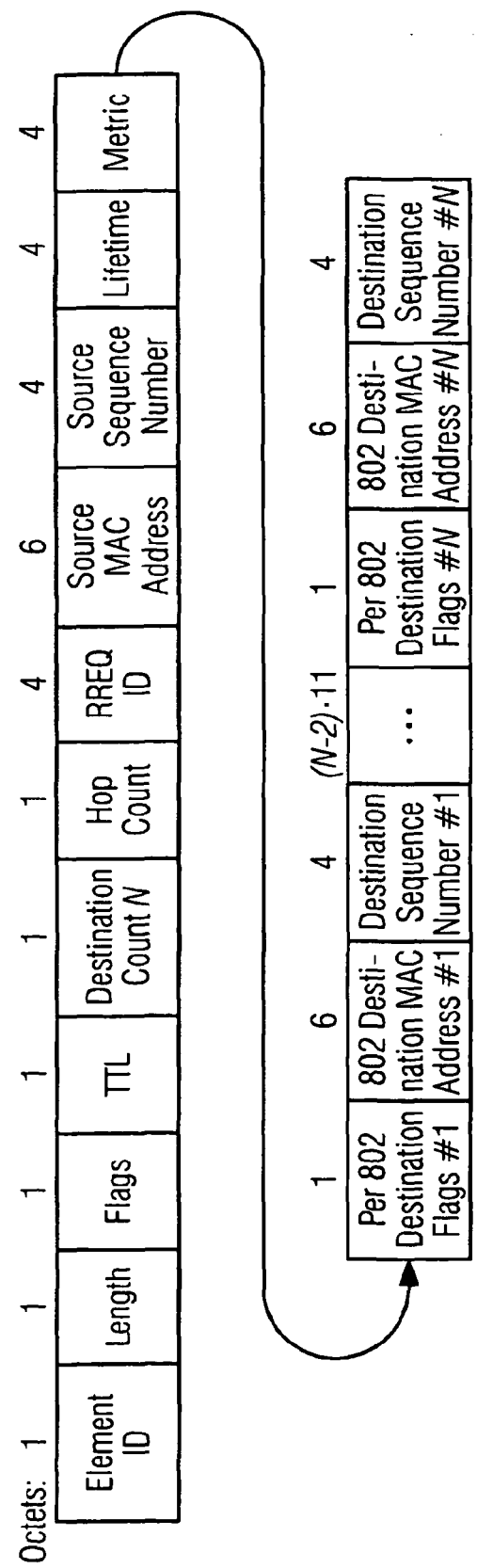
FIG. 2 shows as an exemplary embodiment an RREQ message according to the HWMP protocol, extended by a data field for the lifetime.

A method is therefore proposed by the inventor wherein the route request messages are extended, with a field for the lifetime of the route set with them being inserted in the data fields of the RREQ message, as can be seen in the exemplary embodiment indicated in FIG. 2.

As a further exemplary embodiment, Root Announcement messages, as are currently known only in the HWMP protocol, are to be given a field for the lifetime of the routes set by them to the announced root network node in the data fields of the message.

In this case it is provided that the source node S which generates an RREQ enters in the field for the lifetime the period of time which sets the lifetime of the reverse route to the source node S generated by the RREQ message in the routing tables of the network nodes which receive the RREQ in such a way that the reverse routes will be present at least until a second network message sent by the sink node and acknowledging the first network message has been received by the source node.

In this case the source node S can set, e.g. as in AODV, the value for the lifetime in the RREQ packet, taking into account that for the source node the value of the hopcount parameter is "0", in accordance with the formula cited above in connection with the AODV protocol to 2*NET_TRAVERSAL_TIME, whereas according to HWMP the source node S can set the value for the lifetime in the RREQ packet e.g. by the HWMP_ACTIVE_ROUTE_TIMEOUT parameter.

A network node which receives an RREQ packet thereupon generates or updates the route to the source node S which has been made known to it by the RREQ packet. If a reverse route to the source node S is then generated, the corresponding network node enters the lifetime value from the RREQ packet into the lifetime field of the route in the routing table of the network node.

If a route to the source node S already exists, then the corresponding lifetime field in the routing table is updated with the maximum from the lifetime present in the routing table and the lifetime from the RREQ packet in accordance with the max(ExistingLifetime, rreq.lifetime) function.

The value of the lifetime from the RREQ packet should advantageously be stored in the network node so that it will be available when the lifetime of the corresponding route is renewed by the forwarding of data packets.

Alternatively or in addition, the network node which generates the RREP message in response to the route request can use the value of the lifetime from the RREQ packet as the value for the lifetime in the RREP packet. This is advantageous, but not absolutely necessary.

It is ensured with the method and devices that in the case of an RREQ all of the network nodes use as a minimum the lifetime specified in the RREQ for the reverse route to the source node S. This avoids individual holes in the routes arising due to very fast timeouts of the reverse route in a network node.

The lifetime of the reverse route is furthermore tied only to a specific route request. This means that different route requests can specify different lifetimes. In the related art the same value is configured for the lifetime on all the network nodes and must then be used unchanged for all RREQs.

Using the insertion of the lifetime, as in the example shown in FIG. 2, a flow sequence of the routing method implemented will be explained below with reference to the exemplary topology shown in FIG. 1.

In order to determine a route to the destination node D, the source node S starts a route request with the destination node D as the searched-for destination and the lifetime given by a parameter rreq.lifetime=5.

FIG. 3a now shows routing tables of selected mesh network nodes A . . . S prior to the RREQ.

Proceeding on this basis, FIG. 3b shows the same network nodes following reception of the RREQ message by a first network node A from the source node S. It can be seen that in this exemplary embodiment, after the RREQ message has been processed by the first network node A the routing table of A does not change. This is due to the fact that the already existing lifetime of the already existing route to the source node S is greater than the value specified by the rreq.lifetime parameter, so the safeguarding of an unconditionally necessary lifetime is ensured in any event.

It can be seen in FIG. 3c how the table presents itself when a second network node B receives the RREQ message forwarded by the first network node A. It can be seen that here too, as in the case of the first network node A, nothing in the existing routing table has changed, since once again a value for the lifetime was entered here which is greater than the value specified by the rreq.lifetime parameter.

How the table looks when the second network node B forwards the RREQ message to a third network node G on the path to the destination node D, is shown in FIG. 3d. It can be seen that after the reception by the third network node G of the RREQ message forwarded by the second network node B, an entry has been made in the table for the third network node G as a result of an evaluation of the RREQ message.

This has happened in this case because the third network node G had no route to the source node S up to the time of the reception of the RREQ message. Furthermore, the lifetime which the third network node G was able to take from the RREQ message (rreq.lifetime=5) is also entered in the table, since previously no value for a lifetime was included and the by the value of the rreq.lifetime parameter includes and specifies the minimum value necessary for the lifetime.

Finally, the destination node D receives the RREQ message forwarded by the third network node G. Since the destination node D has previously also had no route to the source node S, one is entered, as can be seen in FIG. 3e. Furthermore, in a similar manner to the procedure in the case of the third network node G, the lifetime from the rreq.lifetime parameter contained in the RREQ packet is taken over.

By using the method it is therefore ensured that all the entries for the reverse route to the source node S have at least a lifetime of 5, which ensures that all the network nodes involved make the reverse route available until the associated RREP message has arrived at the source node S.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method of routing data packets in a wireless communication network formed from a plurality of network nodes, comprising:
    transmitting data packets from a first network node acting as a source of the data packets to a second network node acting as a sink of the data packets with assistance of at least one further network node of the wireless communication network, the at least one further network node being disjoint with respect to the source node;
    transmitting a first network message from the source node at least to one of the further network nodes such that the first network message is forwarded successively to each further network node until the further network node corresponds to the sink node, the first network message containing a value of a first validity period assigned to the first network message;
    temporarily storing a first item of information about a next network node on a path to the source node and the value of the first validity period in a current further network node, the current further network node having made route information available based on the first network message such that the first item of information and the value are able to be temporarily stored,
    wherein the value of the first validity period is stored such that all first items of information remain stored at least until a second network message sent by the sink node and acknowledging the first network message has been received by the source node, the first validity period being a lifetime of a route from the sink node to the source node.

2. The method as claimed in claim 1, wherein the value of the first validity period is stored only if a lesser value is already stored in the current further network node.

3. The method as claimed in claim 1, wherein a value to be stored is determined by the function, max(ExistingLifetime,MinimalLifetime), where ExistingLifetime is the lifetime of an already existing route to the source node, and
MinimalLifetime is an estimate of the lifetime of a route to the source node that is to be set as a minimum.

4. The method as claimed in claim 1, wherein a value to be stored is determined according to an Ad hoc On-Demand Distance Vector protocol by the function, max(ExistingLifetime,MinimalLifetime), where MinimalLifetime=(current_time+2*NET_TRAVERSAL_TIME−
2*HopCount*NODE_TRAVERSAL_TIME),
where ExistingLifetime is the lifetime of an already existing route to the source node,
MinimalLifetime is an estimate of the lifetime of a route to the source node that is to be set as a minimum,
current_time is a current system time,
NET_TRAVERSAL_TIME is a first parameter which can be set for each network node and which represents an estimate of a maximum time taken to send an route request (RREQ) packet through the wireless communication network,
HopCount is a number of further network nodes traversed by the RREQ packet up to and including a current network node, the number having been taken from an updated rreq.hopcount field of the RREQ packet,
NODE_TRAVERSAL_TIME is a second parameter which can be set for each network node and which represents an estimate of a maximum processing time of a packet in a network node.

5. The method as claimed in claim 1, wherein the a value to be stored is determined according to an improvement of an Ad hoc On-Demand Distance Vector protocol by the function, max(ExistingLifetime,MinimalLifetime), where MinimalLifetime=(current_time+2*NET TRAVERSAL TIME−
HopCount*NODE_TRAVERSAL_TIME),
where ExistingLifetime is the lifetime of an already existing route to the source node,
MinimalLifetime is an estimate of a lifetime of a route to the source node that is to be set as a minimum,
current_time is a current system time,
NET_TRAVERSAL_TIME is a first parameter which can be set for each network node and which represents an estimate of a maximum time taken to send a route request (RREQ) packet through the wireless communication network,
HopCount is a number of further network nodes traversed by the RREQ packet up to and including a current network node, the number having been taken from an updated rreq.hopcount field of the RREQ packet,
NODE_TRAVERSAL_TIME is a second parameter which can be set for each network node and which represents an estimate of a maximum processing time of a packet in a network node.

6. The method as claimed in claim 1, wherein the a value to be stored is determined according to a Hybrid Wireless Mesh Protocol (HWMP) by the function, max(ExistingLifetime,MinimalLifetime), where MinimalLifetime=HWMP_ACTIVE_ROUTE_TIMEOUT,
where ExistingLifetime is the lifetime of an already existing route to the source node,
MinimalLifetime is an estimate of a lifetime of a route to the source node that is to be set as a minimum, and
HWMP_ACTIVE_ROUTE_TIMEOUT is a parameter which can be configured for each network node.

7. The method as claimed in claim 6, wherein the value to be stored is determined by the function, Max(ExistingLifetime,MinimalLifetime), where MinimalLifetime=rreq.lifetime, where ExistingLifetime is the lifetime of an already existing route to the source node,
MinimalLifetime is a lifetime of a route to the source node that is to be set as a minimum, and
rreq.lifetime is the value of the first validity period.

8. The method as claimed in claim 1, wherein a value to be stored is determined according to a Hybrid Wireless Mesh Protocol (HWMP) by the function, max(ExistingLifetime,MinimalLifetime), where MinimalLifetime=(current_time+rreq.lifetime−
X*rreq.hopcount*NODE_TRAVERSAL_TIME)

and
X={1,2}, where
NODE_TRAVERSAL_TIME is a second parameter which can be set for each network node and which represents an estimate of a maximum processing time of a packet in a network node,
ExistingLifetime is the lifetime of an already existing route to the source node,
MinimalLifetime is a lifetime of a route to the source node that is to be set as a minimum,
rreq.lifetime is the value of the first validity period,
current_time is a current system time, and
rreq.hopcount is a number of further network nodes traversed by a route request (RREQ) packet up to and including the current network node, the number having been taken from an updated rreq.hopcount field of the RREQ packet.

9. The method as claimed in claim 1, wherein the value of the first validity period is generated dynamically.

10. The method as claimed in claim 8, wherein the value of the first validity period is determined by rreq.lifetime=2*NET_TRAVERSAL_TIME, where rreq.lifetime is the value of the first validity period, and
NET_TRAVERSAL_TIME is a first parameter which can be set for each network node and which represents an estimate of a maximum time taken to send a route request (RREQ) packet through the wireless communication network.

11. The method as claimed in claim 8, wherein the value of the first validity period is determined by $$rreq.\text{lifetime} = \text{HWMP\_ACTIVE\_ROUTE\_TIMEOUT},$$
where rreq.lifetime is the value of the first validity period, and HWMP_ACTIVE_ROUTE_TIMEOUT is a parameter which can be configured for each network node.

12. The method as claimed in claim 1, wherein the value of the first validity period is determined by $$rreq.\text{lifetime} := rreq.\text{lifetime} - X * rreq.\text{hopcount} * \text{NODE\_TRAVERSAL\_TIME})$$

and X={1,2}, where
rreq.lifetime is the value of the first validity period,
rreq.hopcount is a number of further network nodes traversed by the route request (RREQ) packet up to and including the current network node, the number having been taken from an updated rreq.hopcount field of the RREQ packet, and
NODE_TRAVERSAL_TIME is a second parameter which can be set for each network node and which represents an estimate of a maximum processing time of a packet in a network node.

13. The method as claimed in claim 1, wherein the first network message is formed as a route request message.

14. The method as claimed in claim 13, wherein the RREQ message is extended by a data field for the first validity period.

15. The method as claimed in claim 14, wherein a length of four octets is reserved for the data field.

16. The method as claimed in claim 1, wherein the second network message is formed as a route reply message.

17. The method as claimed in claim 16, wherein a value of a second validity period of the RREP message is set equal to the value of the first validity period by the sink node.

18. A network node to route data packets in communication networks, comprising:

a processor configured to execute:
transmitting data packets from a first network node acting as a source of the data packets to a second network node acting as a sink of the data packets with assistance of at least one further network node of the wireless communication network, the at least one further network node being disjoint with respect to the source node;
transmitting a first network message from the source node at least to one of the further network nodes such that the first network message is forwarded successively to each further network node until the further network node corresponds to the sink node, the first network message containing a value of a first validity period assigned to the first network message; and
temporarily storing a first item of information about a next network node on a path to the source node and the value of the first validity period in a current further network node, the current further network node having made route information available based on the first network message such that the first item of information and the value are able to be temporarily stored,
wherein the value of the first validity period is stored such that all first items of information remain stored at least until a second network message sent by the sink node and acknowledging the first network message has been received by the source node, the first validity period being a lifetime of a route from the sink node to the source node.

19. The method as claimed in claim 1, wherein the lifetime of the route from the sink node to the source node is a time that the path is held open until it is released.

20. The network node as claimed in claim 18, wherein the lifetime of the route from the sink node to the source node is a time that the path is held open until it is released.

* * * * *